United States Patent [19]

Kaes et al.

[11] Patent Number: 5,324,134
[45] Date of Patent: Jun. 28, 1994

[54] POSITIVE CONNECTION OF A MAGNETICALLY OPERATED VALVE TO A HOUSING BLOCK, AND METHOD OF FORMING A POSITIVE CONNECTION

[75] Inventors: Guenter Kaes, Stuttgart; Norbert Alaze, Markgroeningen, both of Fed. Rep. of Germany

[73] Assignee: Robert Bosch GmbH, Stuttgart, Fed. Rep. of Germany

[21] Appl. No.: 941,095

[22] PCT Filed: Apr. 5, 1991

[86] PCT No.: PCT/DE91/00288
§ 371 Date: Oct. 3, 1992
§ 102(e) Date: Oct. 3, 1992

[87] PCT Pub. No.: WO91/17378
PCT Pub. Date: Nov. 14, 1991

[30] Foreign Application Priority Data

Apr. 30, 1990 [DE] Fed. Rep. of Germany ....... 4013876

[51] Int. Cl.⁵ .................... F16K 31/00; F16B 17/00
[52] U.S. Cl. .................................... 403/282; 403/19; 403/274; 29/890.13
[58] Field of Search ............... 403/282, 274, 279, 281, 403/19, 20, 24; 29/890.124, 890.13, 890.132, 522.1, 523, 525, 890.13, 890.15; 285/23, 39, 382, 382.7; 137/625.65; 251/129.15; 335/202, 228

[56] References Cited

U.S. PATENT DOCUMENTS

| | | | |
|---|---|---|---|
| 2,466,546 | 4/1949 | Huelster | 29/522.1 |
| 3,749,190 | 7/1973 | Shipman | 403/282 |
| 4,274,665 | 6/1981 | Marsh | 403/282 |
| 4,436,495 | 3/1984 | McCullough | 29/522.1 |
| 4,746,240 | 5/1988 | Tarum | 403/282 |

FOREIGN PATENT DOCUMENTS

| | | | |
|---|---|---|---|
| 3810581 | 10/1989 | Fed. Rep. of Germany . | |
| 1014840 | 4/1952 | France | 403/274 |
| 80657 | 6/1954 | Sweden | 29/890.13 |
| 2131906 | 6/1984 | United Kingdom . | |

Primary Examiner—Randolph A. Reese
Assistant Examiner—Anthony Knight
Attorney, Agent, or Firm—Edwin E. Greigg; Ronald E. Greigg

[57] ABSTRACT

A conveniently assembled positive connection of a magnetically operated valve with a housing block which will withstand high stresses. The housing block has a stepped locating bore which, as the bore depth increases, leads into an undercut. A valve body section has a smaller diameter than the bore in the housing and has a shape which is adapted to the locating bore which leaves a gap between the bore and the valve body section. A sleeve is pressed into the gap which fills the gap, and which engages in the region of the undercut. The sleeve which is subjected to a deforming action, fixes the magnetically operated valve and can withstand high stresses.

9 Claims, 1 Drawing Sheet

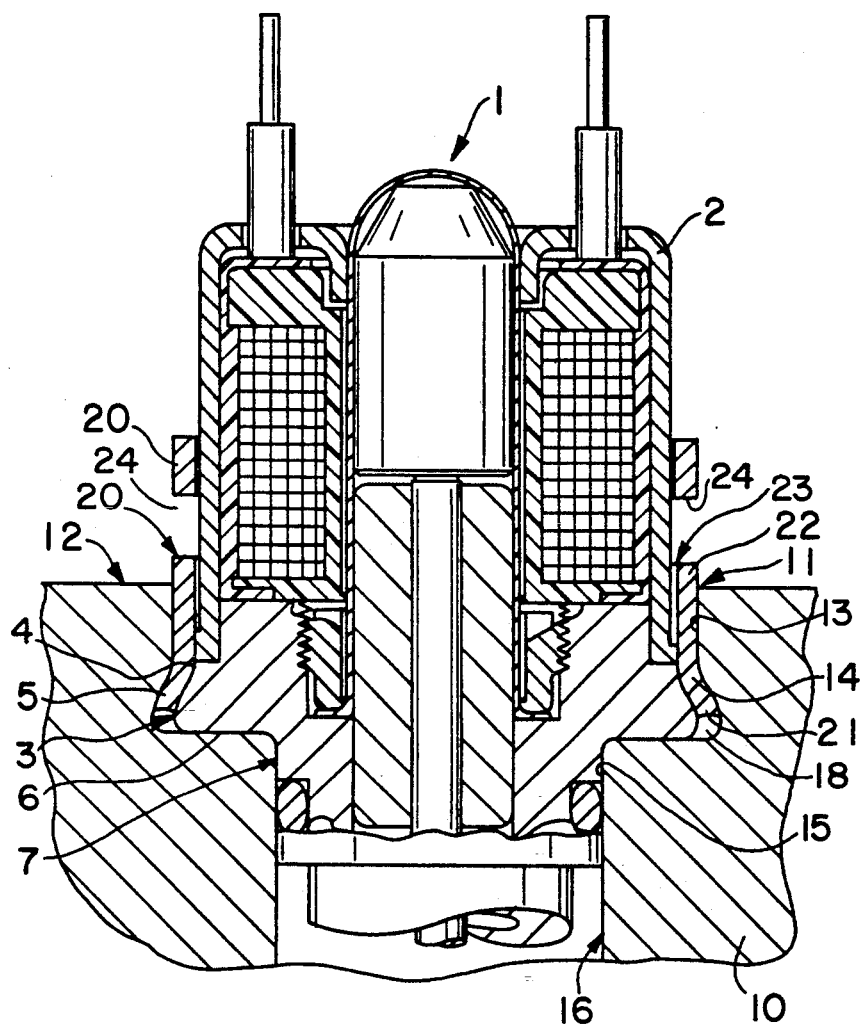

POSITIVE CONNECTION OF A MAGNETICALLY OPERATED VALVE TO A HOUSING BLOCK, AND METHOD OF FORMING A POSITIVE CONNECTION

STATE OF TECHNOLOGY

The invention is based on a positive connection of a magnetically operated valve to a housing block of the valve. The invention further concerns a method of forming a positive connection of a magnetically operated valve to a housing block of a valve.

When fitted in a locating bore, magnetically operated valves are generally in contact with pressure medium feed and discharge lines which terminate in this bore. The fitted magnetically operated valves therefore have high forces acting upon them through the pressure medium which have to be absorbed by the housing block. The positive connections, which are usually achieved by screwing magnetically operated valves into the housing block, or, by holddown plates connected to them, must therefore withstand high stresses, in particular where the magnetically operated valves are those of vehicle hydraulic brake units. Such connections are therefore not only of too costly a design, but also necessitate a relatively high amount of time to be spent on their assembly.

A method is known, for example, from the DE-A-38 10 581, by which two connection plates, which are arranged, parallel with each other, are provided with channels carrying a pressure medium, by arranging one or more magnetically operated valves between the connection plates and clamping these together by means of bolts.

It is further known from the DE-A.38 10 581 that a sleeve section of a magnetically operated valve, opened at the end and carrying a pressure medium, is located in the bore of a housing block of steel and that the aperture edge of the bore is caulked against the sleeve section. Such a positive connection is expensive to manufacture and is problematic with regard to a tight seal.

The invention is therefore based on the task of manufacturing a connection to withstand high stresses between a magnetically operated valve and a housing block, which is largely independent of the material used for the housing block and which is of high precision.

ADVANTAGES OF THE INVENTION

In contrast, the positive connection in accordance with the invention has the advantage that it can be produced within a very short time and in few operations, namely by inserting the magnetically operated valve into the locating bore, pushing the sleeve over the magnetically operated valve, and pressing the sleeve into the gap. These operations can be economically carried out on automatic assembly lines. The connection centers the magnetically operated valve and is capable of absorbing very high axial forces which will attempt to eject the magnetically operated valve from its locating bore. Moreover, the forming of the connection can be easily checked by measuring the pressing depth of the sleeve.

The measures listed herein enable advantageous developments and improvements of the positive connection specified herein.

Using the dimensioning specified for a tapered undercut angle, the forming forces are kept low in the sleeve region which engages in the undercut, and a relatively large cross-sectional area is produced in the deformed sleeve region, which can absorb shearing forces which are caused by ejection forces acting on the magnetically operated valve.

High shearing forces can be absorbed by the sleeve, if the sleeve is metallic.

A sleeve of rolled strip material enables cost advantages during the manufacture of the sleeve to be achieved, in particular if connection of the ends can be dispensed with. In addition, a sleeve which is slit in this way can adapt to diameter tolerances of the locating bore.

Projecting the sleeve beyond a front face allows the construction of the connection to be easily checked by a visual and measurement check.

Projecting the sleeve beyond a front face permits a removal of the positive connection by simple means, for example when the magnetically operated valve is to be replaced.

The method specified herein is remarkable for the facility of allowing the simply formed components, magnetically operated valve and housing block, to be assembled in a few steps to form a connection capable of withstanding high axial loads. With this method, the two components are not subjected to any deformation or intermittently occurring forces.

DRAWING

An embodiment example of the invention is shown simplified in the drawing and described more closely in the description which follows.

DESCRIPTION OF THE EMBODIMENT EXAMPLE

The embodiment example of a positive connection shown in the drawing is of a magnetically operated valve 1, which is intended for use in a vehicle hydraulic brake unit (not shown). The magnetically operated valve 1 has a cylindrical jacket sleeve 2, which is pressed onto a valve body section 3. This has a cylindrical section 4, adjacent to the jacket sleeve 2, of small axial length which, with a radiussed transition, leads into a conical section 5. This conical section 5 has a taper, i.e. an angle between its surface and the valve longitudinal axis, of 30°. Following the largest diameter of the conical section 5, the conical section changes to a radial front face 6. This is followed by a cylindrical valve body region 7 of a smaller diameter.

The magnetically operated valve 1 sits in a partly shown aluminium housing block 10. The housing block 10 has a locating bore 11, which starts from a front face 12 of the housing block with a cylindrical bore section 13. Adjacent to the cylindrical bore section 13, the locating bore 11 leads with increasing bore depth into an undercut 14, i.e. into a radial expansion of the bore 11. The undercut 14 is of conical shape with a taper equal to the conical section 5 of the valve body section 3. The undercut 14 is limited by a radially extending bore step 15. Continuing from this is the locating bore 11 with a bore section 16 which is adapted to the valve body region 7.

The largest diameter of the valve body section 3 which lies in the region of the conical section is smaller than the aperture diameter of the cylindrical bore section 13 in the locating bore 11. The magnetically operated valve 1 can thus be inserted into the locating bore 11 from the front face 12 of the housing block 10, with the valve body region 7 engaging with good fit in the bore section 16. The depth of insertion of the magnetically operated valve 1 is limited by the engagement of the valve body section 3 at the bore step 15. Since the valve body section 3 has a similar cross-sectional form, adapted to the locating bore 11, there remains, with a valve body section 3 supported on the bore step 15, an all-round gap 18 of the same width between the dimensionally appropriately matched two parts. Pressed into the gap 18 between the locating bore 11 and the valve body section 3 is a sleeve 20 which engages in the region of the undercut 14, filling the valve body section.

The sleeve 20 consists of a metallic material, preferably steel. It may be rolled of strip material with a slit along its length with end which are adjacent to each other with very little gap between them. Alternatively, the sleeve 20 may be a cut-off pipe section. As shown by dash-dot lines in the drawing, the sleeve 20 is pushed over the jacket sleeve 2, after the magnetically operated valve 1 has been inserted into the housing block 10, and is pressed into the gap 18 between the valve body section 3 and the locating bore 11, by means of a suitable tool (not shown). When the sleeve 20 impacts on the cone shaped section 5 of the valve body section 3, the sleeve region 21 is subjected to a deformation which amounts to a plastic widening-out. The press-in action is complete when the sleeve 20 fills the gap 18 in the region of the undercut 14. With appropriate dimensioning of the gap 18 and the sleeve 20, an axial and radial fixing of the magnetically operated valve 1, free from play, is achieved in the locating bore 11 of the housing block 10. The presence of a section 22 of sleeve 20 which projects beyond the front face 12 of the housing block 10 and a check on the size of the separation between the front face 12 of the housing block 10 and the upper free front face 23 of the sleeve 20 allows an easy check on the quality of the positive connection between the magnetically operated valve 1 and the housing block 10.

For dismantling purposes, the projecting section 22 of the sleeve 20 can have a projection beyond the front face 12 of the housing block 10 which is greater than that shown. For the engagement of a withdrawal tool not shown, at the projecting section 22, the latter may be provided with several holes 24 distributed around the circumference in which the withdrawal tool can engage and remove the sleeve 20 from the gap 18. The magnetically operated valve 1 can then be removed from the locating bore 11 of the housing bore 10.

In place of the materials mentioned for the valve body section 3, the housing block 10, and the sleeve 20, it is possible to use other suitable materials.

It is also possible for the angle of taper which determines the undercut 14, to be of a different size, for example, up to 60°. Preferably, however, an angle of taper between 5° and 30° should be selected, in order to achieve favourable conditions during the deforming action of the sleeve 20 in the gap 18, and of the required retention force against ejection of the magnetically operated valve 1 from the locating bore 11. The foregoing relates to a preferred exemplary embodiment of the invention, it being understood that other variants and embodiments thereof are possible within the spirit and scope of the invention, the latter being defined by the appended claims.

We claim:

1. A positive connection of a magnetically operated valve (1) to a housing block (10) including a locating bore (11) for a valve body section (3) which is axially and radially fixed within said bore, in which arrangement a largest diameter of the valve body section (3) is smaller than an aperture diameter of the locating bore (11), said housing block includes a large diameter cylindrical bore (13) with a shoulder (6) within said cylindrical bore that extends to a smaller diameter portion (15), the locating bore (11), the cylindrical bore section (13) near shoulder (6) widens with an increasing bore depth into an undercut (14), the magnetically operated valve includes a valve body section (3) which has a shape adapted to the locating bore (11) with the undercut (14) which leaves an all-round gap (18) of the same width as the bore; a split sleeve (20) is pressed into the gap (18) between the locating bore (11) and the valve body section (3) which fills the gap and engages the valve body section in the region of the undercut (14) to prevent withdrawal of the valve (1), the sleeve (20) projects beyond a front face (12) of the bore (13) in the housing block (10) which limits the locating bore (11), and the sleeve (20) includes apertures (24) for engagement by a withdrawal tool at a section (22) which projects beyond the front face (12) of the housing block (10).

2. A positive connection in accordance with claim 1, in which the undercut (14) is of conical shape with an angle of a taper of about 5° to 60°.

3. A positive connection in accordance with claim 2, in which the undercut (14) is of conical shape with an angle of taper of from about 5° to about 30°.

4. A positive connection in accordance with claim 1, in which the sleeve (20) is of a metallic material.

5. A positive connection in accordance with claim 4, in which the sleeve (20) is a rolled strip of material.

6. A positive connection in accordance with claim 1, in which the sleeve (20) is of a metallic material which is steel.

7. A positive connection in accordance with claim 1, in which the sleeve (20) is a rolled strip of material.

8. A method for forming a positive connection between a magnetically operated valve (1) in a housing block (10) comprising the steps of forming a stepped locating bore (11) in said housing having a large diameter bore (13) which includes a shoulder (6) that extends to a smaller diameter bore, forming an undercut (14) in said large diameter bore juxtaposed said shoulder (6), said under (14) increasing in depth and diameter toward said shoulder (6), forming a cylindrical bottom end valve body section (3) having a cylindrical section (4) having a smaller diameter than said large diameter bore (13) of said housing, forming a bottom end of said cylindrical section (4) with a small axial length with a radiussed transition that leads to a conical section (5) of greater diameter than said cylindrical section (4) with an outer diameter slightly less than said large diameter bore (13) of said housing block, inserting said bottom end of said valve into said stepped bore in said housing block, thereby leaving a gap (18) surrounding said cylindrical section (4) of said bottom end valve body section, forming a cylindrical sleeve of sufficient length to extend into said undercut (14) and to extend with an end portion above said housing block for ease of removing said sleeve and with a diameter of sufficient dimension to fit said cylindrical sleeve and with a linear slit extending over the length of said cylindrical sleeve, and forcing said cylindrical sleeve over said valve and into said gap, including said undercut (14), whereby said valve is retained within said housing block by said sleeve (20) filling the gap (18) and with the end portion extending above said housing block.

9. A method as claimed in claim 8, in which said sleeve is formed with apertures in the end portion that extends above said housing block.

* * * * *